W. K. BETHUNE.
TRACTION DEVICE.
APPLICATION FILED MAR. 7, 1917.
1,284,221.
Patented Nov. 12, 1918.
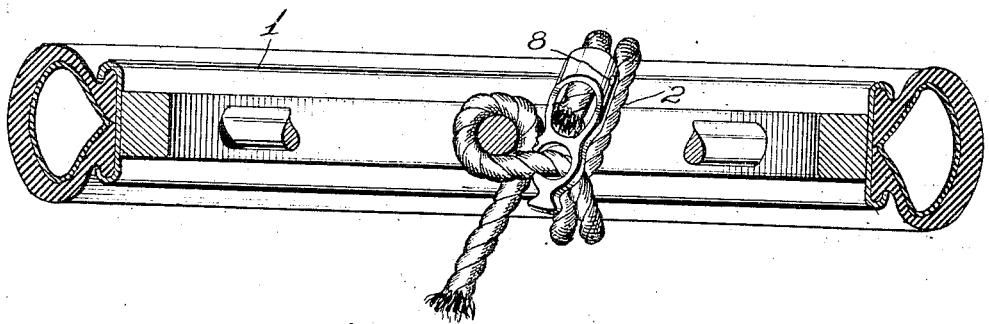
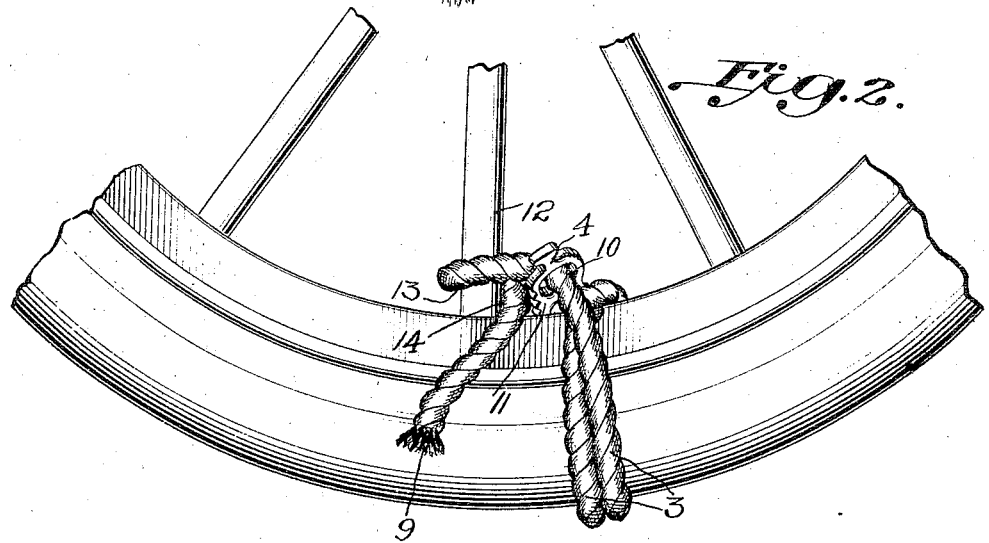
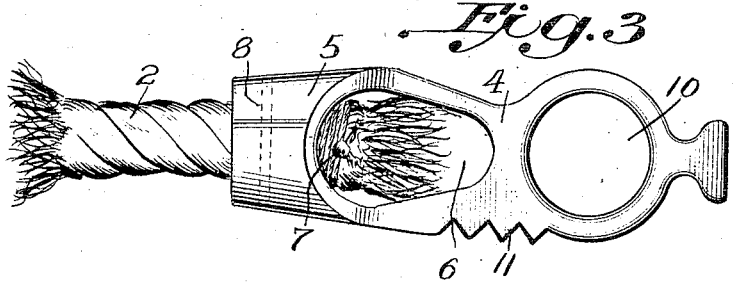
Inventor:
Walton K. Bethune

UNITED STATES PATENT OFFICE.

WALTON KESBY BETHUNE, OF LUMBERTON, NORTH CAROLINA.

TRACTION DEVICE.

1,284,221. Specification of Letters Patent. Patented Nov. 12, 1918.

Application filed March 7, 1917. Serial No. 153,184.

*To all whom it may concern:*

Be it known that I, WALTON K. BETHUNE, of Lumberton, Robeson county, North Carolina, have invented a certain new and useful Improvement in Traction Devices, of which the following is a specification.

This invention relates to new and useful improvements in traction devices for motor or other vehicle wheels.

It often becomes necessary when vehicles are traveling on soft ground to use some sort of traction means on the wheels to prevent what is called "spinning" of the wheels and it is the object of the present invention to provide a device which may be quickly attached to the vehicle wheel to increase its tractive force, and when not needed may be removed and placed in the tool box or other convenient place in the vehicle.

Another object of this invention lies in the use of a rope in the manner to be hereinafter described, which forms an efficient tractive means, having decided advantages over similar devices of this character.

With these and other objects in view, the present invention consists in the combination and arrangement of parts, as will hereinafter more fully be described, it being understood that changes in the form, proportion, and size, and minor details may be made within the scope of the claims without departing from the spirit of the invention.

In the drawings, Figure 1 is a cross sectional view of a portion of a wheel showing the manner in which the device is fastened thereon when in use. Fig. 2 is a side elevation of the same showing the manner in which the rope is applied to a tire to increase the traction force of the wheel. Fig. 3 is an enlarged view of a rope fastening means.

Referring now more particularly to the drawings in which like numerals designate like parts in each of the several views numeral 1 designates an ordinary vehicle wheel of any type and forms no part of the present invention, it being shown to illustrate the application of the device thereto.

The traction device consists of a flexible element 2, preferably a rope of hemp or other suitable material wrapped around the rim of the wheel. A terminal holding element 4 is secured to one end of the rope, for securely holding the attachment to the wheel when in use, said terminal element comprising a tapered sleeve 5 through which the rope 2 is drawn in from the enlarged end 6. The end of the rope is wound with a cord 7 or some other means for holding the terminal element 4 on the rope. Should it be desired, however, a pin 8 may be passed through the sleeve 5 and that portion of the rope confined therein, thus providing a further means for securing the terminal element 4 on the rope.

When in use the rope is wrapped around the rim of the wheel near one of the spokes 12, as shown at 3 in the drawing. The free end 9 of the rope is then run through the eye 10 in the holding member 4 and around the spoke 12, as at 13, and then under the loop, between the spoke and the holder 4 as shown at 14. The said holder has a plurality of gripping teeth 11 laterally disposed thereon for frictional contact with the rope at this point where the same will be held regardless of the length of the rope or the size of the wheel on which the device is used.

From the foregoing it will thus be seen that the traction device when secured in place on the wheel as described forms an efficient gripping surface on the tread of the wheel, due to the construction of the flexible element, the manner in which it is applied to the wheel and the novel means of fastening the same.

In reduction to practice, I have found that the form of my invention illustrated in the drawings and referred to in the above description as the preferred embodiment is the most efficient and practical, yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention as defined in the appended claims.

Having thus described my invention, what I claim as new and desire to cover by Letters Patent is:

1. The combination with a wheel including spokes and a rim of a terminal holding element comprising a tapered sleeve, one end of said holding element being provided with an eye; a plurality of gripping teeth disposed upon one side of said element; and a rope adapted to be passed around said rim, said rope having one end secured within said sleeve, the other end of the rope being passed through said eye and around a spoke said teeth having engagement with the latter named end of the rope.

2. The combination with a wheel including spokes and a rim of a terminal holding element comprising a tapered sleeve, one end of said holding element being provided with an eye; a plurality of gripping teeth disposed upon one side of said element; and a rope adapted to be passed around said rim, said rope having one end secured within said sleeve, the other end of the rope being passed through said opening and around a spoke, said teeth having engagement with the latter named end of the rope; and means for securing one end of said rope within said sleeve.

In witness whereof, I have hereunto set my hand this 6th day of March, 1917.

WALTON KESBY BETHUNE.